(12) United States Patent
Gogolla

(10) Patent No.: US 6,597,156 B2
(45) Date of Patent: Jul. 22, 2003

(54) ARRANGEMENT AND METHOD FOR GENERATING HIGH VOLTAGE FROM A LOW-VOLTAGE SUPPLY SOURCE

(75) Inventor: Torsten Gogolla, Frastanz (AT)

(73) Assignee: Hilti Aktingesellschaft, Schaan (LI)

( * ) Notice: Subject to any disclaimer, the term of this patent is extended or adjusted under 35 U.S.C. 154(b) by 37 days.

(21) Appl. No.: 09/859,869

(22) Filed: May 17, 2001

(65) Prior Publication Data
US 2001/0045814 A1 Nov. 29, 2001

(30) Foreign Application Priority Data
May 25, 2000 (DE) .......................... 100 25 834

(51) Int. Cl.⁷ .......................... G05F 1/613; H02M 3/18
(52) U.S. Cl. .......................... 323/224; 363/59; 320/116
(58) Field of Search .......................... 323/282, 224, 323/225; 307/109, 110; 320/122, 124, 128, 135, 166, 167; 363/59, 60, 61

(56) References Cited

U.S. PATENT DOCUMENTS

| | | | |
|---|---|---|---|
| 4,618,812 A | | 10/1986 | Kawakami .......... 323/224 |
| 5,783,928 A | * | 7/1998 | Okamura .......... 320/122 |
| 5,926,384 A | | 7/1999 | Jochum et al. .......... 363/56 |
| 5,949,223 A | | 9/1999 | Mine .......... 323/224 |

FOREIGN PATENT DOCUMENTS

| | | |
|---|---|---|
| DE | 2351127 | 2/1978 |
| DE | 4023612 | 1/1992 |
| EP | 0124030 | 11/1984 |
| EP | 0794607 | 9/1997 |
| WO | 9808151 | 2/1998 |

* cited by examiner

Primary Examiner—Jessica Han
(74) Attorney, Agent, or Firm—Sidley Austin Brown & Wood, LLP

(57) ABSTRACT

The invention is directed to an arrangement and a method for generating high voltage from a low-voltage supply source using a charge reservoir chargeable and rechargeable to the desired high voltage or higher via a charge pump. A first switching device regulates the supply of electric charge from the precharged charge reservoir to a separate storage capacitor. As a result, a high voltage signal that is extensively noise-free is available during certain operating phases, such as a measurement process. A second switching device ensures a regulated discharge from the storage capacitor when the capacitor is overcharged, for example, for the readjustment of the high voltage to be generated. A capacitive voltage divider, which reduces the high voltage without losses, is provided to determine the actual value of the high voltage. At very small currents, the desired high voltage can be maintained by using the capacitive voltage divider for a substantially longer time than by using an ohmic voltage divider.

15 Claims, 2 Drawing Sheets

Figure 1:
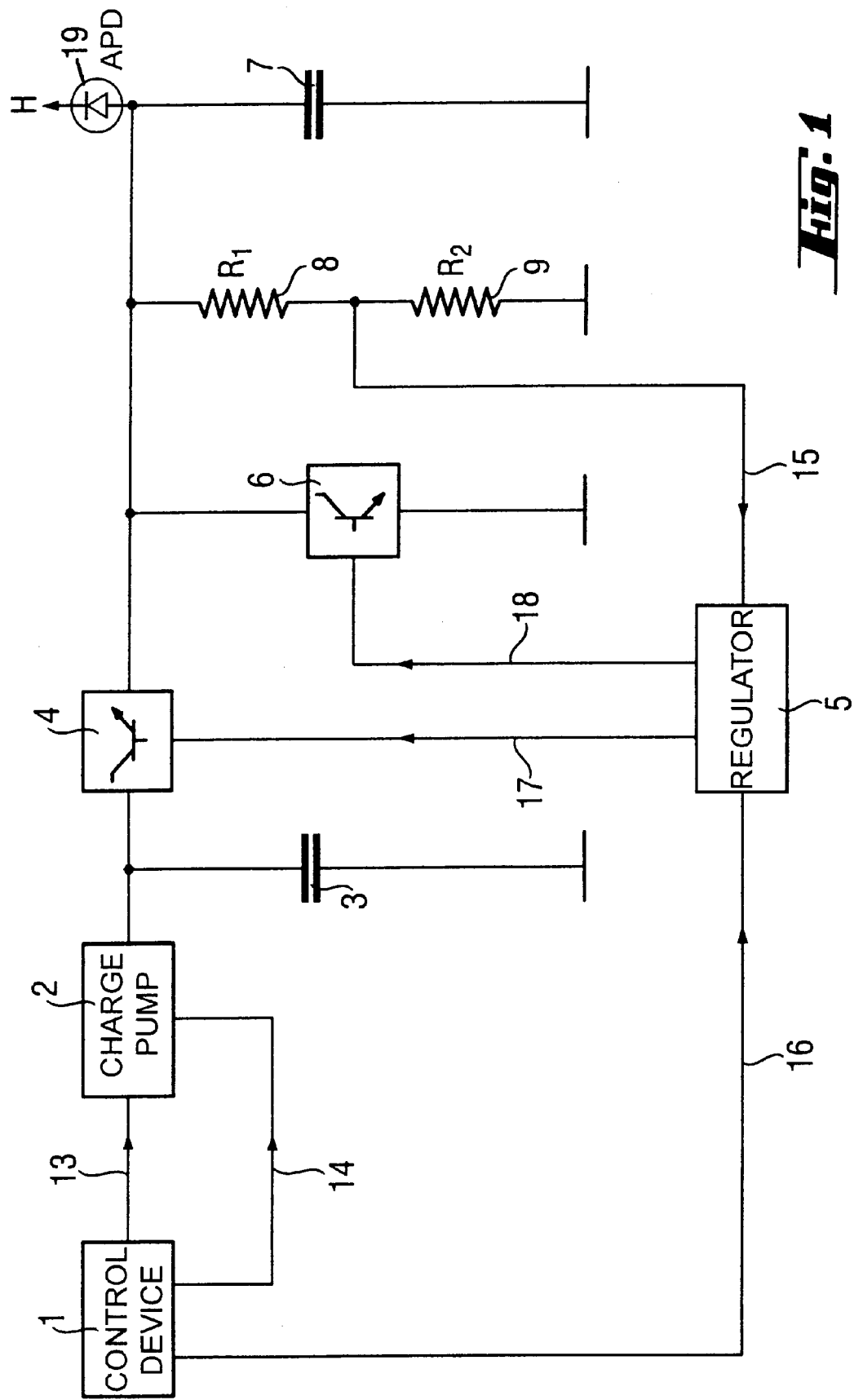

ARRANGEMENT AND METHOD FOR GENERATING HIGH VOLTAGE FROM A LOW-VOLTAGE SUPPLY SOURCE

FIELD OF THE INVENTION

The invention is directed to an arrangement for generating high voltage from a low-voltage supply source, preferably a commercially available battery or an accumulator using a charge reservoir which can be charged and recharged, via a charge pump, to at least a desired high voltage, wherein a first switching device regulates a supply of electric charge from the charge reservoir to a storage capacitor.

The invention is further directed to a method for generating high voltage from a low-voltage supply source, particularly from a commercially available battery that is used as a power supply source for a large number of electrical and electronic devices.

BACKGROUND OF THE INVENTION

There are many small, portable electric or electronic devices that are supplied with power from a battery, wherein a low voltage that is a high voltage in comparison to the battery or accumulator voltage is needed within the device. Such a device contains, for instance, an optoelectronic measurement system for distances of up to 100 m with an accuracy of a few millimeters. Optoelectronic measuring systems of this type have become important in the construction industry and in plant engineering, among other areas, particularly because such systems eliminate the need to use defined target markings on the object whose distance is to be determined from an observation point or reference point. As a result, setup time and manufacturing time in the construction field, among others, can be reduced and costs can be lowered as well as manufacturing tolerances reduced. Optoelectronic measurement systems of this type are described, for example, in EP 0 701 702 B1, DE 196 43 287 A1 and U.S. Pat. No. 4,403,857. Reference is also made to a new proposed optoelectronic distance measurement system, which is the subject matter of German Patent Application 100 06 493.0.

An important performance feature of these types of optoelectronic measurement devices is their dynamics, which should be as extensive as possible in order to process very weak measurement signals as well as relatively strong measurement signals. Avalanche photodiodes, which are recommended as a rule, are used as receiver elements to guarantee the required dynamic behavior, i.e., to ensure detection of very weak measurement signals. However, since avalanche photodiodes (APDs) must be operated at comparatively high off-state or blocking voltages of, e.g., 70 V to 250 V, an arrangement is required for generating high voltage with as little interference as possible. Since the APDs which are used as receiver elements are operated in the blocking direction below their breakdown voltage and, on the other hand, since only very low light outputs are detected, it is only necessary to take into account very small photocurrents. These photocurrents, including dark currents, are in the range of about 1 nA to 100 nA. Therefore, the high-voltage source, which is supposed to supply the blocking voltage, is only required to deliver a very low electrical output.

In general, initially, an alternating voltage is generated to generate the high voltage from the battery voltage of, for example, 3 V. According to one possibility, the alternating voltage is fed to a transformer on the primary side and subsequently transformed to high voltages. The secondary-side high alternating voltage is then rectified by diodes and filtered via capacitors and possibly stabilized by a regulator. This regulation of high voltage is usually carried out by changing the pulse width ratio of the primary-side alternating voltage, which corresponds to a pulse width modulation signal.

Another possibility for generating high voltage comprises the use of switched currents in coils. Generally, a transistor which is driven by a pulse width modulation signal is used as switch. Directly after the coil current is switched off, initially, the current continues to flow because of the continuity compelled by the inductance and, with every switch-off process, charges a capacitor via a diode. The diode prevents the charged capacitor from discharging due to charge return. In this arrangement, stabilization, i.e., the regulation of the high voltage, is carried out by the pulse width ratio of the alternating voltage driving the transistor. An arrangement of this type is also known as a charge pump because electrical charges are pumped into the capacitor when the coil current is turned off.

As was already stated, one problem for high-accuracy distance measurement on technical surfaces, e.g., a concrete wall, by use of an optoelectronic distance measurement system is the problems in detecting very weak reflection signals. Accordingly, the measurement system tolerates only very low electronic noise interference. However, the switching processes mentioned above, in connection with the generation of high voltage, lead to interference when currents are switched over in the coil or coils; increasing the noise as a whole and thus reducing the sensitivity of the distance measurement.

SUMMARY OF THE INVENTION

It is, thus, the object of the invention to provide a method and an arrangement for generating high voltage from a low-voltage supply source, in which there is no interference and no additional noise during the useful application of such high voltage.

In accordance with the invention there is provided an arrangement for generating high voltage from a low-voltage supply source, especially a commercially available battery or accumulator using a charge reservoir which can be charged and recharged via a charge pump, wherein a first switching device regulates the supply of electrical charge from the charge reservoir to a storage capacitor at which the desired high voltage can be tapped and a second switching device regulates the discharge from the storage capacitor when the storage capacitor is overcharged.

According the invention, the high voltage can be rendered extensively free from noise for determined periods of use through the use of a storage capacitor, which is provided in addition to the charge reservoir and to which electric charges are supplied so as to be regulated in a determined manner and wherein electric charges are discharged from this storage capacitor. In addition, the high voltage can be quickly increased and reduced, which is particularly important, for example, in the above-mentioned optoelectronic distance measuring devices that are outfitted with APDs, when the avalanche amplification of the APDs should or must be adapted quickly to different environmental conditions.

The method, according to the invention, for generating high voltage from a low-voltage supply source, comprises a first step, in which a charge reservoir is charged via a charge pump to a voltage above a desired high voltage, and a second step, in which a regulated charge is effected from the charge reservoir to a storage capacitor, which is to be charged to the high voltage to be generated. In a third step, when the storage capacitor is overcharged, a regulated discharge takes place.

The first and second switching arrangements are preferably, controllable current sources, which are controlled by a regulator, wherein a signal corresponding to the actual high voltage at the storage capacitor is applied to the actual-value input of the regulator, while a signal corresponding to the desired high voltage at the storage capacitor is applied to the respective reference-value input.

Alternatively, the first and second switching arrangement can be a controllable switch with a charging and discharging resistor connected in series with the respective switching path; these switches are controlled by a regulator, wherein a signal corresponding to the actual instantaneous high voltage at the storage capacitor is applied to the actual-value input of the regulator, while a signal corresponding to the desired high voltage at the storage capacitor is applied to the reference-value input.

BRIEF DESCRIPTION OF THE INVENTION

Further advantageous details and developments of the invention are described more fully in the following description with reference to drawings illustrating exemplary embodiments of the invention.

Figure 2:
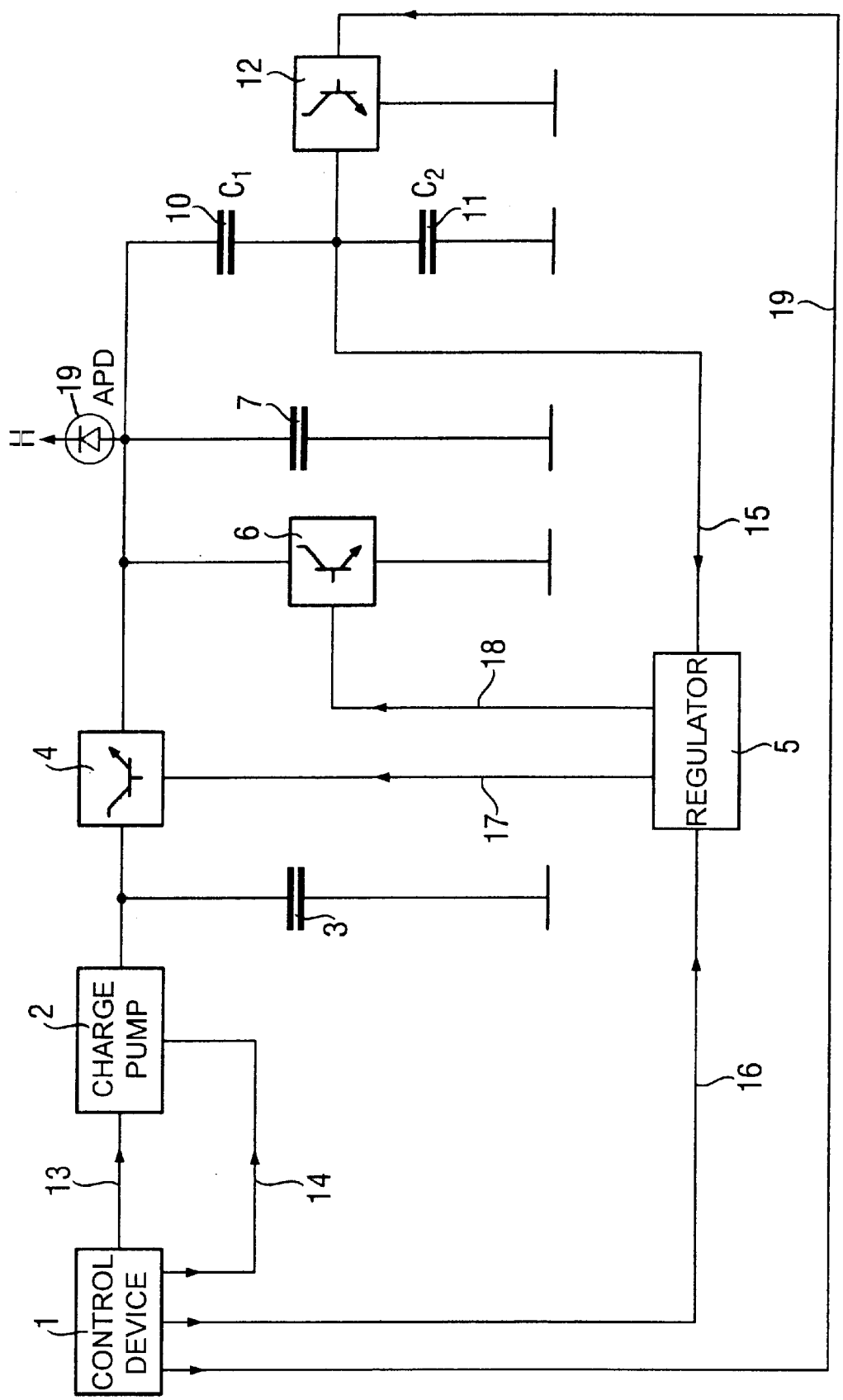

FIG. 1 shows a block diagram of a circuit arrangement for generating high voltage without interference, in accordance with the invention; and FIG. 2 shows a block diagram of a circuit arrangement, which is modified with respect to FIG. 1, for interference-free generation of high voltage with capacitive voltage dividers.

DETAILED DESCRIPTION OF INVENTION

The circuit arrangement according to FIG. 1 for generating high voltage, which is preferably quickly modifiable and which is extensively noise-free, comprises a charge pump 2, which is controlled by a control device 1, for example, a microcontroller, and by means of which a charge reservoir, particularly a capacitor 3, is charged to or above a desired high voltage corresponding to an alternating signal supplied by the control device 1 by influencing the pulse width ratio. A first current source 4, which is controlled by a regulator 5 and possibly a controllable switch, determines the charge inflow to a storage capacitor 7 at which the desired high voltage can be tapped. The charge flow out of the storage capacitor 7 is determined via a second current source 6, which is also controlled by the regulator 5 and which is replaceable by a controllable switch. The reference high voltage is predetermined for the regulator 5 by the overriding control device 1. The actual high voltage value for the regulator 5 is preferably predetermined via a voltage divider 8, 9 with a fixed divider ratio; in the circuit according to FIG. 1, this is an ohmic voltage divider.

For purposes of explaining the manner in which the circuit arrangement according to FIG. 1 functions, it is assumed that such circuit used as a high-voltage generator for the APD blocking voltage(s) in an optoelectronic distance measurement system of the type mentioned above.

After the distance measurement device is switched on and before the actual distance measurement, i.e., while, for example, a light spot generated by a laser diode is positioned by the user on the measurement surface, a pulse-width-modulated alternating signal which drives the charge pump 2 in a known manner, described above, is generated by the microcontroller which is usually already present in the measurement device, that is, via the control device 1. By means of the charge pump 2, the capacitor 3 with a relatively high capacitance (e.g., 1 $\mu$F) is charged in an uncontrolled manner to a high voltage which should be, for example, about 10% higher than the maximum high voltage to be supplied, that is, than the APD 19 blocking voltage. The charge pump 2 can be switched on or off by a control signal which is also supplied by the microcontroller 1.

According to the inventive idea, the interfering charge pump 2 is deactivated during the measuring process which can last for a period of several minutes in case of numerous individual measurements (tracking). The required high voltage, particularly the APD 19 blocking voltage, is now adjusted and stabilized with the charge stored in the charge reservoir, that is, in the capacitor 3, via the first current source 4 and the second current source 6 by means of the regulator 5. To increase the high voltage, the storage capacitor 7 is Instead of the controlled current sources 4, 6, a controlled switch, for example, a transistor or possibly a relay and a resistor connected in series with this switch, can be used. Accordingly, when the switch is closed, the change in high voltage is effected by the charge flow controlled via the resistor belonging to the respective switch.

The regulation of high voltage can also be carried out directly via the control device 1, for example, a microcontroller. For this purpose, the actual voltage value which is reduced by the voltage divider is digitized by an analog-to-digital converter and the control device 1, in which the reference value and actual value are compared. The control device 1 controls the current sources 4, 6 and the corresponding switch so that the desired high voltage reference value, e.g., the blocking voltage, is adjusted. However, this arrangement increases computing costs for the control unit 1.

As is shown in FIG. 2, a capacitive divider 10, 11 can also be used as a voltage divider 8, 9 for reducing the actual voltage value. The capacitive voltage divider offers substantial advantages over the ohmic divider because no additional electrical power is required of the high-voltage source. For some preferred applications such as the optoelectronic distance measuring systems mentioned above, even with very high-ohm voltage dividers (several times 10 Mohm), the current through these dividers dominates. An increase in the divider resistances $R_1$, $R_2$ in the 100 Mohm range is critical in the case of an ohmic divider because the regulation is prone to interference. In addition, very high-ohm resistors are relatively expensive. When a capacitive voltage divider is used, the charge reservoir 3 and the storage capacitor 7 can maintain the desired high voltage substantially longer than if an ohmic voltage divider is used.

Because of the input current of the regulator 5, the voltage divider capacitor 11 (capacitance $C_2$) is charged or discharged during operation so that the regulated high voltage gradually drifts up and down to higher and lower values, respectively. At a capacitance of $C_2$=100 nF, for instance, the control voltage is reduced at the capacitor 11 after a duration of 100 seconds by about 10 mV, assuming a typical input current of 10 pA for the FET inputs for the control unit. With a voltage reduction of 100:1, this means that the high voltage is increased by 1 V. Because of this discharge current, the high voltage cannot be kept constant for any desired length of time. After a certain time period which is defined by the control device depending on the tolerable voltage error, but also for changing the high voltage, the capacitances $C_1$, $C_2$ of the voltage divider 10, 11 are discharged via associated switchable current sources 6 and 12 (or controllable switches, e.g., transistors or relays), so that a defined state is adjusted and a correct actual voltage value can be measured at the actual-value input of the regulator 5.

Also, for initialization, the capacitors 10, 11 should or must be discharged through the controllable current sources 6 and 12 (switching elements) because $C_2$ can be charged, for example, through the actual-value input of the regulator 5.

The arrangement, according to the invention, for generating high voltage and the method, according to the invention, which is applied therein offer the following advantages:

A high voltage that is free from interference signals to a great extent is made available at least during certain operating phases, for example, in the course of a measurement cycle, by an optoelectronic distance measurement device resulting in a considerable increase in measurement accuracy.

The value of the generated high voltage can be quickly changed through the use of a plurality of current sources and switches and corresponding control of the charge in-flow and out-flow, which is important particularly for the above-mentioned optoelectronic distance measurement with the use of APDs when a high dynamic range is to be ensured with rapidly changing reception signals.

With existing presets, for example, in case of the above-mentioned optoelectronic distance measurement, the desired generation of high voltage without interference can be realized at only a slight extra expenditure through the use of the already existing microcontroller for generating the alternating signal for the charge pump 2. In this respect, it may be significant that no additional expenditure in the microcontroller is required for regulating the APD voltage, since the charge reservoir 3 is charged in an uncontrolled manner and the stabilization of the APD voltage, that is, the high voltage, can be realized in a simple manner by means of a commercially available regulator, wherein the regulation is not carried out via pulse width modulation, for which purpose an increased expenditure on programming and hardware would be required in the microcontroller.

When a capacitive voltage divider (FIG. 2) is used to reduce the actual value of the high voltage, the high voltage can be maintained substantially longer, for example, with very low photocurrents of an APD 19 than when an ohmic voltage divider is used. The charge pump 2 must then only be activated relatively seldom. This is advantageous when measuring weak signals such as they occur, for example, in distance measurement techniques. In addition, it is no longer necessary to use extremely high-ohm divider resistors which are expensive and can lead to instability in voltage regulation. Due to the very low power consumption of the load, very small and inexpensive coils can also be used for the charge pump 2. The space requirement and costs are reduced.

In principal, the method according to the invention is suitable for low-noise high-voltage generation for many applications in metrology with weak signals and at loads with very low power consumption. Aside from APDs, photomultipliers are also possible.

In principle, a capacitive voltage divider (compare FIG. 2) can be used in all high-voltage generation of this type. However, its use offers special advantages at loads with very low power consumption.

What is claimed is:

1. An apparatus for generating a controlled, low noise high voltage from a low-voltage supply source, wherein the source may be selected from the group of a battery and an accumulator, using a charge reservoir (3) that is chargeable and rechargeable by a charge pump (2), to at least a desired high voltage and above, comprising a first switching device (4) for regulating the supply of electric charge from the charge reservoir (3) to a storage capacitor (7), and for providing said controlled high-voltage to a load, said charge pump (2) function being interrupted for a time period during which the low noise is required.

2. The apparatus of claim 1, further comprising a second switching device (6) for regulating the discharge from the storage capacitor (7) when the storage capacitor (7) is overcharged.

3. The apparatus of claim 2, wherein the first and second switching devices (4, 6) are controllable current sources that are controlled by a regulator (5), and wherein a signal corresponding to the actual high voltage at the storage capacitor (7) is applied to the actual-value input of the regulator (5), while a signal corresponding to the desired high voltage at the storage capacitor (7) is applied to a reference-value input.

4. The apparatus of claim 3, wherein a reduced proportion of the actual high voltage at the storage capacitor (7) is applied to the actual-value input of the regulator (5) via a voltage divider (8, 9; 10, 19) that is arranged parallel to the storage capacitor (7).

5. The apparatus of claim 4, wherein the voltage divider is an ohmic voltage divider.

6. The apparatus of claim 4, wherein the voltage divider is a capacitive voltage divider (10, 11).

7. The apparatus of claim 6, further comprising a third switching device (12) for discharging the capacitive voltage divider.

8. The apparatus of claim 3, further comprising a control device (1) for the charge pump (2) that presets the reference value of the high voltage for the reference-value input of the regulator (5).

9. The apparatus of claim 8, further comprising a device associated with the control device (1) for occasionally interrupting the charging operation of the charge pump (2).

10. The apparatus of claim 9, comprising at least one avalanche photo diode as a receiver element with a respective blocking voltage being determined by the high voltage present at the storage capacitor (7), wherein the charge reservoir (3) of the charge pump (2) is dimensioned such that the occasional interruption of the charging operation by the control device (1) outlasts at least one measurement cycle with the optoelectronic distance measurement arrangement.

11. The apparatus of claim 2, wherein the first and second switching devices (4, 6) are controllable switches each having a charging resistor and discharging resistor connected in series with the respective switching path, wherein the switches are controlled by a regulator (5), and wherein a signal corresponding to the actual instantaneous high voltage at the storage capacitor (7) is applied to the actual-value input of the regulator (5), while a signal corresponding to the desired high voltage at the storage capacitor (7) is applied to the reference-value input.

12. The apparatus of claim 1, comprising at least one avalanche photodiode as a receiver element with a respective blocking voltage being determined by the high voltage present at the storage capacitor (7).

13. A method for generating a high voltage from a low-voltage supply source comprising the steps of: charging a charge reservoir via a charge pump to a voltage value above a desired reference value of the high voltage; charging a storage capacitor to a high voltage to be generated; providing a regulated charge flow from the charge reservoir to the storage capacitor; and providing a regulated discharge in the event that the storage capacitor is overcharged.

14. The method of claim 13, wherein the step of charging the storage capacitor further comprises the step of regulating the charge flowing into and the charge flowing out of the storage capacitor by presetting the blocking voltage required instantaneously for at least one avalanche photodiode in the measurement arrangement such that the blocking voltage value required for the avalanche photodiode is maintained during a measurement cycle when the operation of the charge pump is shut down.

15. The method of claim 13, further comprising the step of presetting a reference high voltage value at a regulator, wherein the regulator causes at least one of a charge to flow from the charge reservoir of the charge pump into the storage capacitor and a discharge from the storage capacitor as soon as the actual high voltage value differs from the reference high voltage value.

* * * * *